US012452578B2

(12) United States Patent
Bai

(10) Patent No.: US 12,452,578 B2
(45) Date of Patent: Oct. 21, 2025

(54) MASSAGE SOOTHING EARPHONE

(71) Applicant: Shenzhen Vocational and Technical University, Shenzhen (CN)

(72) Inventor: Jie Bai, Shenzhen (CN)

(73) Assignee: Shenzhen Vocational and Technical University, Shenzhen (CN)

(*) Notice: Subject to any disclaimer, the term of this patent is extended or adjusted under 35 U.S.C. 154(b) by 142 days.

(21) Appl. No.: 18/586,615

(22) Filed: Feb. 26, 2024

(65) Prior Publication Data

US 2025/0274698 A1 Aug. 28, 2025

(51) Int. Cl.
*H04R 1/10* (2006.01)
*A61H 23/02* (2006.01)

(52) U.S. Cl.
CPC ....... *H04R 1/1091* (2013.01); *A61H 23/0254* (2013.01); *H04R 1/1033* (2013.01); *A61H 2201/1215* (2013.01); *A61H 2201/1611* (2013.01); *A61H 2205/04* (2013.01); *H04R 1/1008* (2013.01)

(58) Field of Classification Search
CPC ............ A61H 23/0254; A61H 2205/04; A61H 2201/1611; A61H 2201/1215; H04R 1/1091; H04R 1/1033; H04R 1/1008
See application file for complete search history.

(56) References Cited

FOREIGN PATENT DOCUMENTS

| | | | |
|---|---|---|---|
| CN | 104970957 A | * | 10/2015 |
| CN | 209299500 U | * | 8/2019 |
| CN | 215080660 U | * | 12/2021 |
| CN | 216600014 U | * | 5/2022 |

OTHER PUBLICATIONS

Machine translation of CN-216600014-U; 2022.*
Machine translation of CN-209299500-U; 2019.*
Machine translation of CN-215080660-U; 2021.*
Machine translation of CN-104970957-A; 2015.*

* cited by examiner

*Primary Examiner* — Andrew Sniezek

(57) ABSTRACT

The present invention belongs to the field of earphones, and particularly relates to a massage soothing earphone, comprising an elastic neck band. Both sides of the upper end of the elastic neck band are fixedly connected with a support rod respectively, the upper end of the support rod is fixedly connected with an earphone cover, and the inner side of the elastic neck band is provided with an adjustable pressing-kneading integrated mechanism for massaging the neck of a person. The present invention achieves an adjustable massage effect on the neck of a person, and realizes the diversification of massage actions by two massage methods of vibration and kneading so that the person feels more comfortable and more soothing.

10 Claims, 8 Drawing Sheets

MASSAGE SOOTHING EARPHONE

TECHNICAL FIELD

The present invention belongs to the field of earphones, and particularly relates to a massage soothing earphone.

BACKGROUND

A headphone is a converting unit, which accepts electric signals from a media player or receiver and converts the signals into audible sound waves using a speaker close to ears. The headphone can be separated from the media player and can be connected with only one plug, allowing listening to the sound alone without affecting others. The sound of the ambient environment also can be isolated, which is very helpful for people who use the headphone in noisy environments such as recording room, bar, journey and sports. The headphone is originally for phones and radios.

A headset is worn on the head, and generally composed of two parts: a signal transmitter and earphones with signal receiving and amplifying devices. Such headset does not need to be inserted into acoustic meatus but is worn above ears, and thus is more comfortable than in-ear headphones.

When in use, most of the existing headsets are used in front of computers, so a person will experience neck discomfort after sitting for a long period of time.

A patent application with the announcement No. of CN101656903B discloses a headset. The headset comprises: a head band, which is flexible; a slider, which is flexible and is provided with the head band on one end and a headset unit on the other end; a sliding groove, which is arranged at the end of the head band or at one end of the slider for guiding the circumferential motion of the slider relative to the head band; and a slider guide element, which has higher rigidity than the head band and the slider and is used for holding one end of the slider at the end of the head band in a state of fit with the sliding groove so that one surface of the slider facing one surface of the head band moves circumferentially relative to the one surface of the head band. The headset provided by the invention can achieve a thin type while avoiding the degradation of wearing performance.

However, the above patent document still has the following deficiencies in practical application:

The above patent has no massage effect on the neck of a person, and the person may experience neck discomfort after sitting in front of a computer for a long period of time, which will lead to a series of diseases, affecting the health of the person.

Therefore, the present invention provides a massage soothing earphone.

SUMMARY

In order to make up for the deficiencies of the prior art and solve at least one technical problem raised in the background, the present invention provides a massage soothing earphone.

To solve the technical problems, the present invention adopts the following technical solution: a massage soothing earphone, comprising an elastic neck band, wherein both sides of the upper end of the elastic neck band are fixedly connected with a support rod respectively, the upper end of the support rod is fixedly connected with an earphone cover, and the inner side of the elastic neck band is provided with an adjustable pressing-kneading integrated mechanism for massaging the neck of a person.

The adjustable pressing-kneading integrated mechanism comprises a first sliding sleeve fixedly connected to the middle part of the rear side of the elastic neck band, the first sliding sleeve is slidably connected with a second sliding sleeve, the lower end surface of the second sliding sleeve is fixedly connected with a case, both ends of the rear side of the lower end surface of the inner cavity wall of the case are fixedly connected with a fixing rod respectively, the upper end of the fixing rod is fixedly connected with a support plate, both sides of the front end surface of the support plate are fixedly connected with a spring damper respectively, the piston end of the spring damper is fixedly connected with a vibrating plate, both sides of the front end surface of the vibrating plate are fixedly connected with a first electric telescopic rod respectively, the piston end of the first electric telescopic rod is fixedly connected with a first connecting rod, the left and right ends of the first connecting rod are rotatably provided with a second connecting rod respectively, the front end of the second connecting rod is rotatably provided with a third connecting rod, one side away from the front end surface of the third connecting rod is fixedly connected with a connecting rod, the front end of the connecting rod is fixedly connected with a rectangular plate, and the front side of the rectangular plate is fixedly connected with a massaging pad.

Preferably, the middle part of the lower side of the support plate is fixedly connected with a motor, the output end of the motor is fixedly connected with an eccentric block, and the eccentric block is rotatably arranged on the support plate.

Preferably, the middle part of the rear end surface of the first connecting rod is fixedly connected with a second electric telescopic rod, the piston end of the second electric telescopic rod is fixedly connected with a fourth connecting rod, and the left and right ends of the fourth connecting rod are rotatably connected with the third connecting rod respectively.

Preferably, the upper end of the inner cavity of the first sliding sleeve is provided with a shear fork expansion and contraction mechanism, the lower end of the shear fork expansion and contraction mechanism is provided with a mounting plate, and the mounting plate is fixedly connected with the case.

Preferably, both sides of the upper end of the elastic neck band are fixedly connected with a support rod respectively, the upper end of the support rod is fixedly connected with an earphone cover, and the sides of the earphone covers close to each other are provided with a damping ring respectively.

Preferably, one side of the elastic neck band is also provided with a harness storage mechanism with adjustable length.

Preferably, the harness storage mechanism with adjustable length comprises a wind-up roll rotatably arranged on the front end of the right side of the elastic neck band, and both sides of the wind-up roll are sleeved and fixedly connected with a limit disc respectively.

Preferably, the central part of the right end surface of the limit disc on the right side is fixedly connected with a turning block, and the surface of the turning block is provided with anti-skid texture.

Preferably, an earphone cord is wound on the wind-up roll, and the bottom of the earphone cord is provided with a connector.

Preferably, the front end of the right side of the elastic neck band is fixedly connected with a groove plate, the groove plate is slidably connected with a lifting rod, the lifting rod is slidably connected with a sliding column, the upper end of the sliding column is fixedly connected to the groove plate, the lower end of the sliding column is fixedly connected to the groove plate, the upper end of the sliding column is sleeved with a spring, the upper end of the spring is fixedly connected with the groove plate, the lower end of the spring is fixedly connected with the sliding column, and the right end of the lifting rod is rotatably provided with a pressure roller.

The present invention has the following beneficial effects:

1. For the massage soothing earphone of the present invention, firstly, the elastic neck band is worn on the neck of a person, the second sliding sleeve can be slid on the first sliding sleeve through the shear fork expansion and contraction mechanism due to different lengths of necks of different persons, and the height of the massaging pad is adjusted to be aligned with the neck of the person; then the first electric telescopic rod is started to drive the first connecting rod to get close to the neck of the person so that the massaging pad is fitted with the neck of the person; the motor is started to drive the eccentric block to continuously rotate; due to the irregular shape of the eccentric block, when the convex end of the eccentric block is in contact with the vibrating plate, the massaging pad will squeeze the neck of the person, and when the arc end of the eccentric block is in contact with the vibrating plate, the vibrating plate will recover under the action of the spring damper so that the massaging pad can produce vibration to massage the neck of the person, which is vibratory massage; when it is necessary to knead the neck of the person, the second electric telescopic rod can be started to drive the fourth connecting rod to move away from the neck of the person so that the third connecting rods on both sides can rotate in different directions at the same time, the connecting rods on both sides can drive the rectangular plate to move and squeeze the massaging pad, and both ends of the massaging pad are squeezed to the middle part, so the massaging pad presents a kneading action to knead the neck of the person, so as to realize another massage method, thus having an adjustable massage effect on the neck of the person, and two massage methods of vibration and kneading can be used to realize the diversification of massage actions so that the person feels more comfortable and more soothing.
2. For the massage soothing earphone of the present invention, the earphone covers are fitted with the ears of the person, and the sound is transmitted to the person through the earphone covers and the damping rings, thus having a cushioning effect on the ears of the person so that the sound is more soothing, which prevents the ears of the person from being injured.
3. For the massage soothing earphone of the present invention, the wind-up roll is rotated by manually rotating the turning block so as to wind or unwind the earphone cord, the length of the connector is adjusted so that the connector can be inserted into the interface of the host to adapt to different use demands, which is convenient, and under the action of the spring, the lifting rod uses the pressure roller to compress the earphone cord at the wind-up roll under the elastic force of the spring, so as to prevent the earphone cord from getting loose and messy.

The present invention realizes kneading on the neck of a person to realize another massage method so as to achieve an adjustable massage effect on the neck of the person, and realizes the diversification of massage actions by two massage methods of vibration and kneading so that the person feels more comfortable and more soothing; the present invention has a cushioning effect on the ears of the person so that the sound is more soothing, which prevents the ears of the person from being injured; and under the action of the spring, the lifting rod uses the pressure roller to compress the earphone cord at the wind-up roll under the elastic force of the spring, so as to prevent the earphone cord from getting loose and messy.

DESCRIPTION OF DRAWINGS

The present invention is further described below in combination with the drawings.

Figure 1:
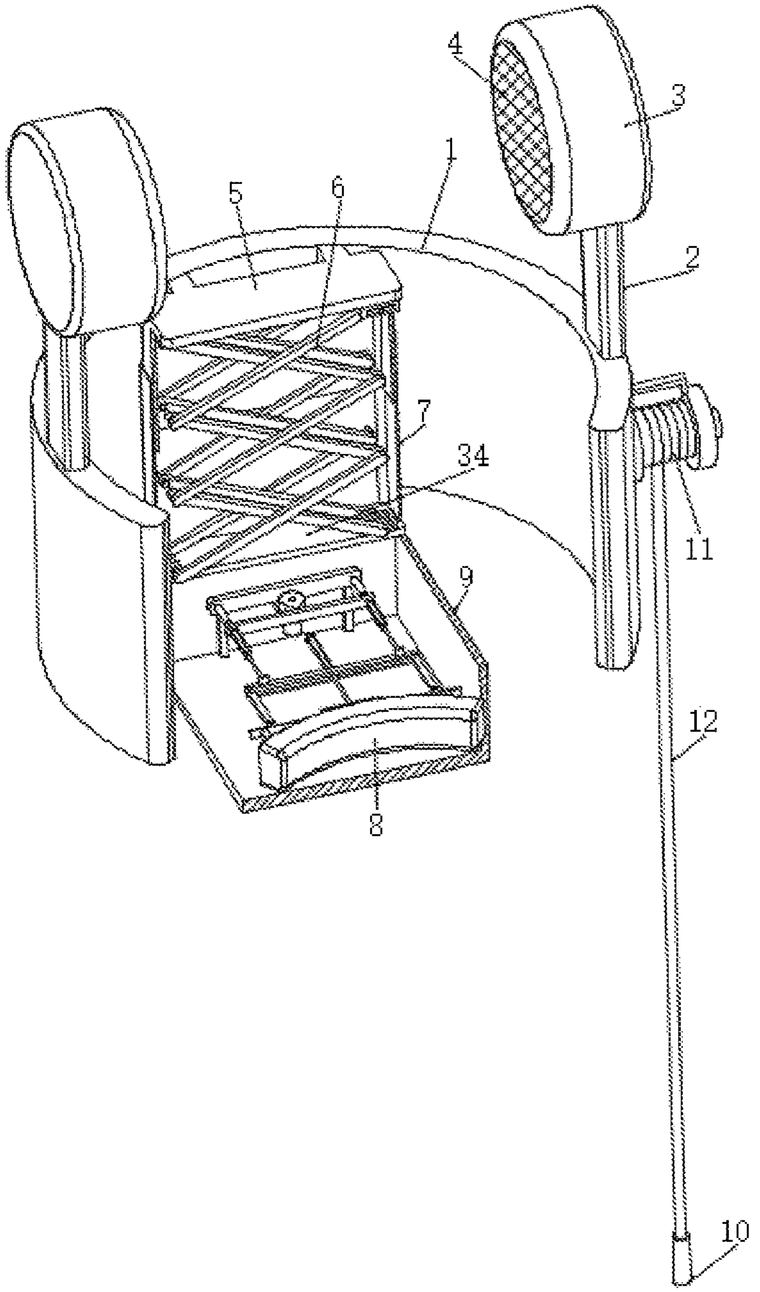
FIG. 1 is a local sectional three-dimensional structural schematic diagram of the present invention.
Figure 2:
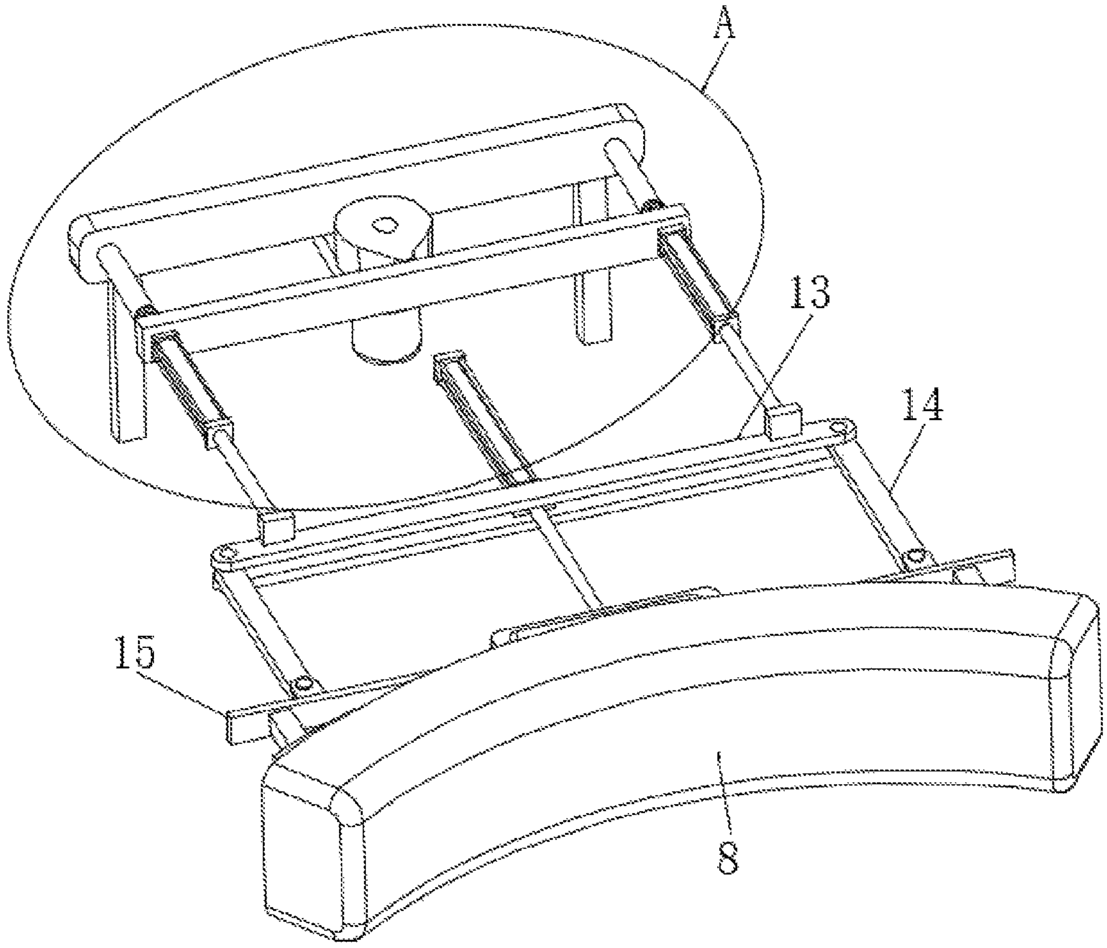
FIG. 2 is a local three-dimensional structural schematic diagram of a massaging pad.
Figure 3:
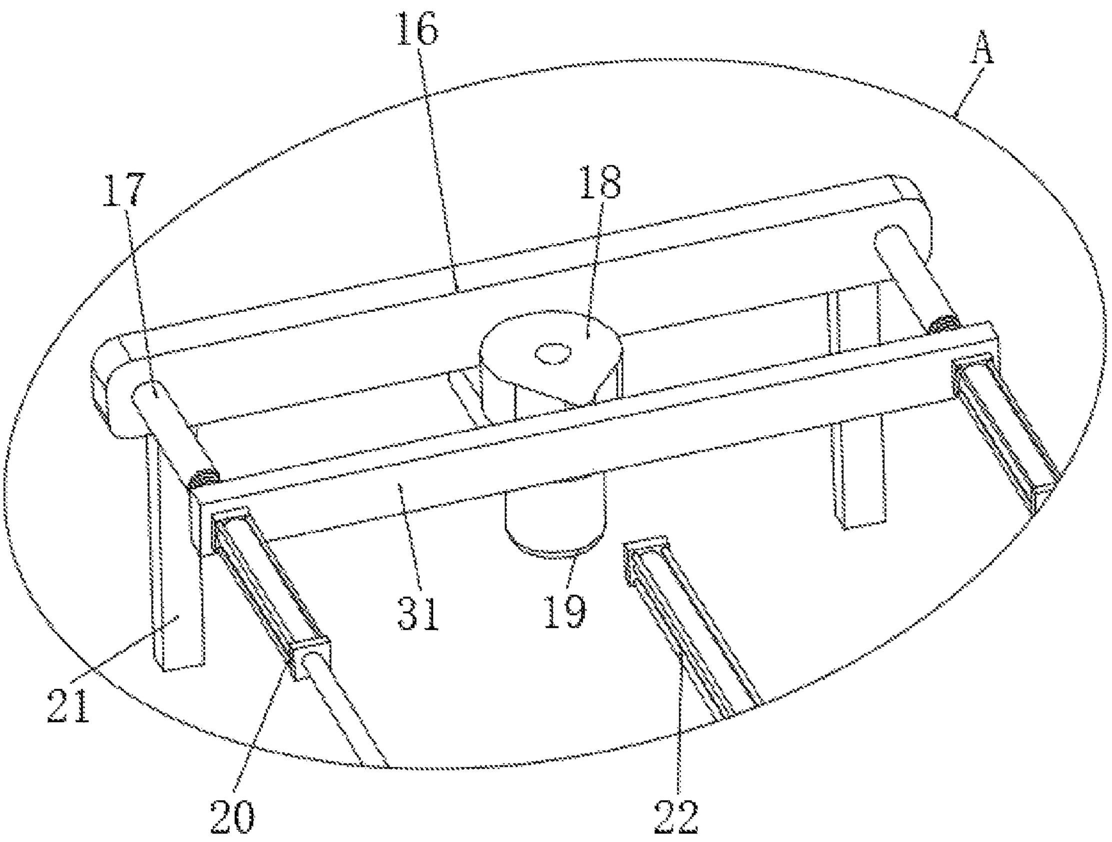
FIG. 3 is a local enlarged view of position A in FIG. 2.
Figure 4:
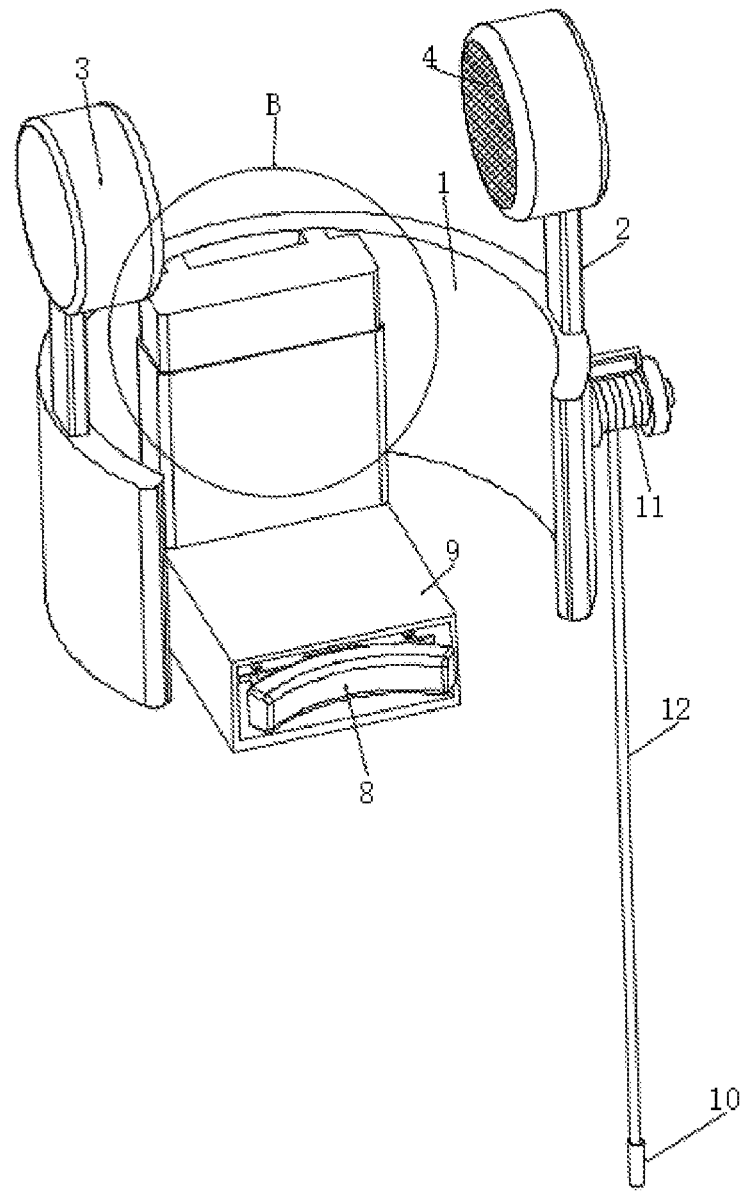
FIG. 4 is a complete three-dimensional structural schematic diagram of the present invention.
Figure 5:
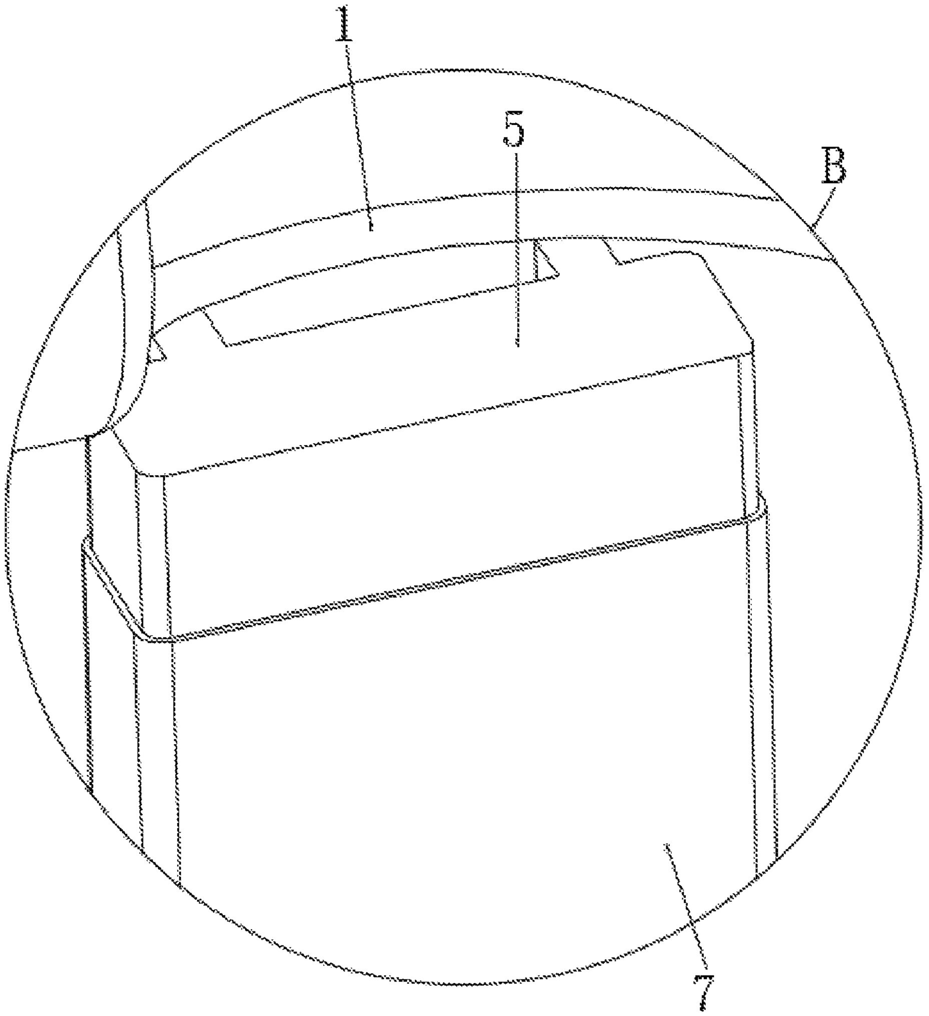
FIG. 5 is a local enlarged view of position B in FIG. 4.
Figure 6:
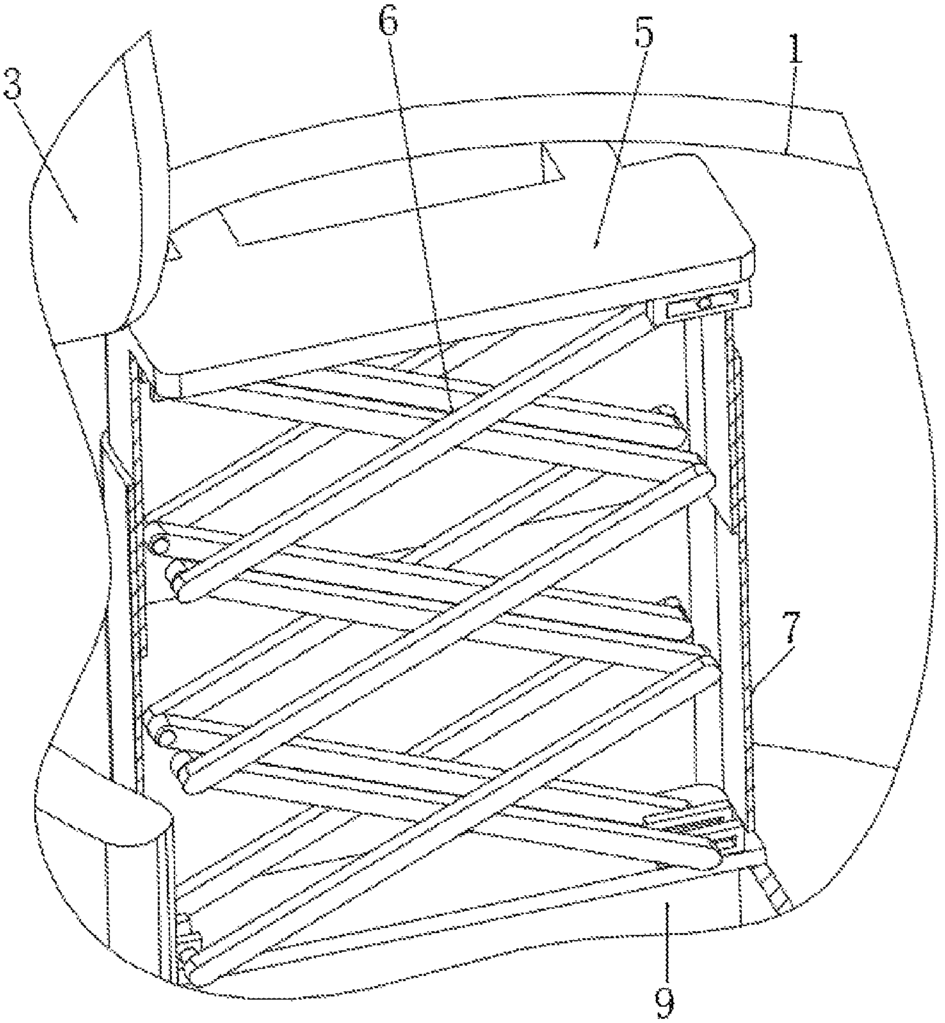
FIG. 6 is a local three-dimensional structural schematic diagram of a shear fork expansion and contraction mechanism.
Figure 7:
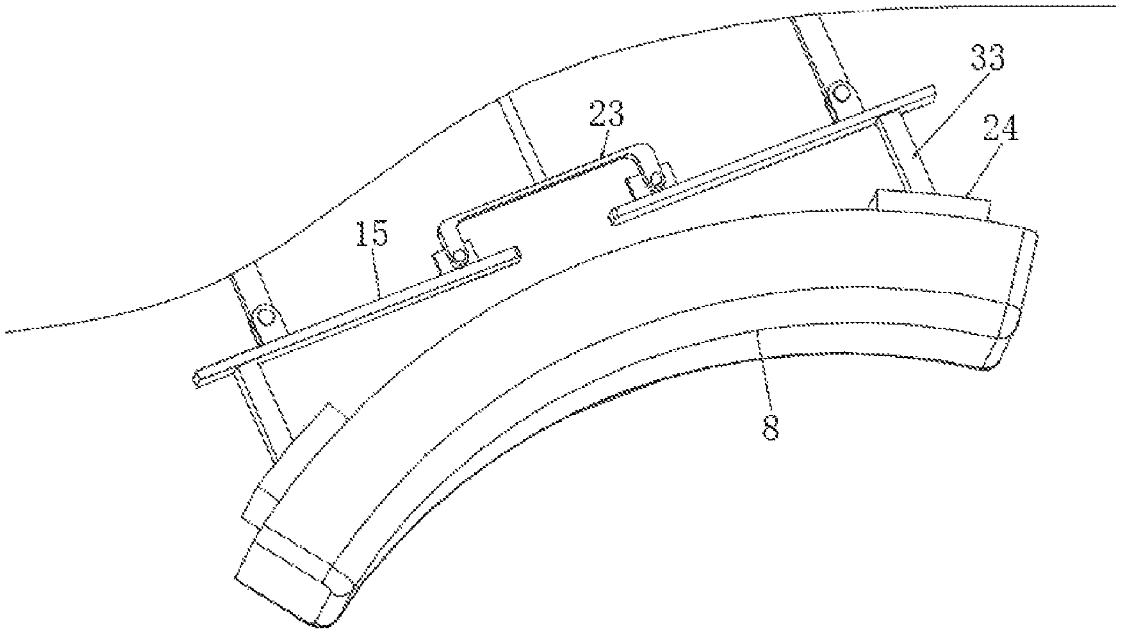
FIG. 7 is a local three-dimensional structural schematic diagram of a third connecting rod.
Figure 8:
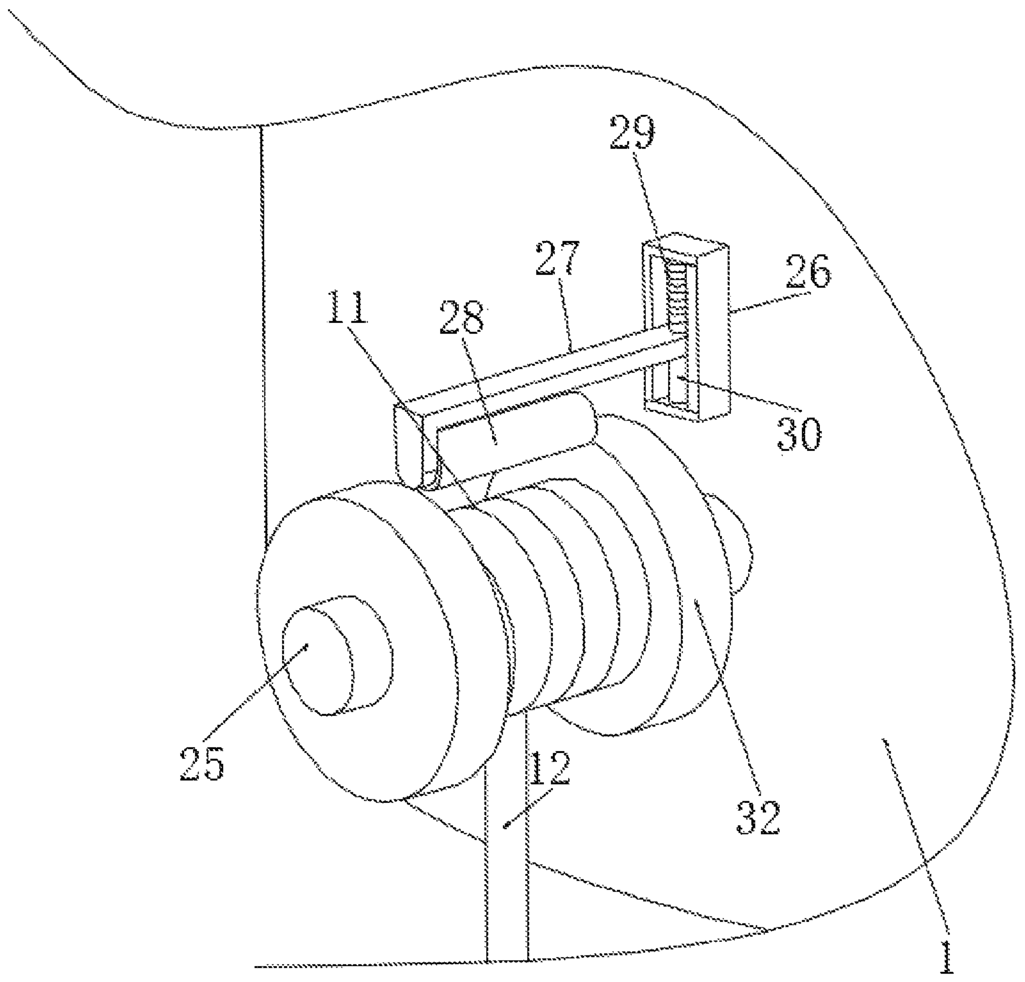
FIG. 8 is a local three-dimensional structural schematic diagram of a wind-up roll.

In the figures: 1. elastic neck band; 2. support rod; 3. earphone cover; 4. damping ring; 5. first sliding sleeve; 6. shear fork expansion and contraction mechanism; 7. second sliding sleeve; 8. massaging pad; 9. case; 10. connector; 11. wind-up roll; 12. earphone cord; 13. first connecting rod; 14. second connecting rod; 15. third connecting rod; 16. support plate; 17. spring damper; 18. eccentric block; 19. motor; 20. first electric telescopic rod; 21. fixing rod; 22. second electric telescopic rod; 23. fourth connecting rod; 24. rectangular plate; 25. turning block; 26. groove plate; 27. lifting rod; 28. pressure roller; 29. spring; 30. sliding column; 31. vibrating plate; 32. limit disc; 33. connecting rod; and 34. mounting plate.

DETAILED DESCRIPTION

The technical solution of the present invention will be clearly and fully described below in combination with the drawings. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Referring to FIG. 1 to FIG. 8, the present invention provides a technical solution: a massage soothing earphone, comprising an elastic neck band 1, wherein both sides of the upper end of the elastic neck band 1 are fixedly connected with a support rod 2 respectively, the upper end of the support rod 2 is fixedly connected with an earphone cover 3, and the inner side of the elastic neck band 1 is provided with an adjustable pressing-kneading integrated mechanism for massaging the neck of a person.

The adjustable pressing-kneading integrated mechanism comprises a first sliding sleeve 5 fixedly connected to the middle part of the rear side of the elastic neck band 1, the first sliding sleeve 5 is slidably connected with a second sliding sleeve 7, the lower end surface of the second sliding sleeve 7 is fixedly connected with a case 9, both ends of the rear side of the lower end surface of the inner cavity wall of the case 9 are fixedly connected with a fixing rod 21 respectively, the upper end of the fixing rod 21 is fixedly connected with a support plate 16, both sides of the front end surface of the support plate 16 are fixedly connected with a spring damper 17 respectively, the piston end of the spring damper 17 is fixedly connected with a vibrating plate 31, both sides of the front end surface of the vibrating plate 31 are fixedly connected with a first electric telescopic rod 20 respectively, the piston end of the first electric telescopic rod 20 is fixedly connected with a first connecting rod 13, the left and right ends of the first connecting rod 13 are rotatably provided with a second connecting rod 14 respectively, the front end of the second connecting rod 14 is rotatably provided with a third connecting rod 15, one side away from the front end surface of the third connecting rod 15 is fixedly connected with a connecting rod 33, the front end of the connecting rod 33 is fixedly connected with a rectangular plate 24, and the front side of the rectangular plate 24 is fixedly connected with a massaging pad 8.

Specifically, a headset is worn on the head, and generally composed of two parts: a signal transmitter and earphones with signal receiving and amplifying devices. Such headset does not need to be inserted into acoustic meatus but is worn above ears, and thus is more comfortable than in-ear headphones. When in use, such headset is usually used in front of a computer, so a person will experience neck discomfort after sitting for a long period of time. To solve this problem, when the embodiment is used:

Firstly, the elastic neck band 1 is worn on the neck of the person; when massage is needed, the height of the mounting plate 34 is adjusted by driving the second sliding sleeve 7 to slide on the first sliding sleeve 5 so as to adjust the height of the massaging pad 8 so that the massaging pad 8 can be just aligned with the neck of the person; then the vibrating plate 31 can be driven to produce vibration in the forward and backward direction, and the massaging pad 8 can produce vibration under the transmission of the first electric telescopic rod 20, the first connecting rod 13, the second connecting rod 14, the third connecting rod 15, the fourth connecting rod 23 and the rectangular plate 24 so that the massaging pad 8 can squeeze the neck of the person so as to achieve the massage effect; meanwhile, when the second connecting rod 14 and the third connecting rod 15 are driven to rotate, the connecting rod 33 and the rectangular plate 24 can simultaneously drive both ends of the massaging pad 8 to the middle part of the massaging pad 8 to form a kneading action, which can realize kneading massage on the neck of the person. The above method solves the problem that the existing headset does not have a variety of massage methods, which is convenient for soothing the neck of the person and reducing the incidence probability of neck diseases.

In the embodiment, as shown in FIG. 1 to FIG. 7, the middle part of the lower side of the support plate 16 is fixedly connected with a motor 19, the output end of the motor 19 is fixedly connected with an eccentric block 18, and the eccentric block 18 is rotatably arranged on the support plate 16.

The middle part of the rear end surface of the first connecting rod 13 is fixedly connected with a second electric telescopic rod 22, the piston end of the second electric telescopic rod 22 is fixedly connected with a fourth connecting rod 23, and the left and right ends of the fourth connecting rod 23 are rotatably connected with the third connecting rod 15 respectively.

The upper end of the inner cavity of the first sliding sleeve 5 is provided with a shear fork expansion and contraction mechanism 6, the lower end of the shear fork expansion and contraction mechanism 6 is provided with a mounting plate 34, and the mounting plate 34 is fixedly connected with the case 9.

Specifically, a headphone is a converting unit, which accepts electric signals from a media player or receiver and converts the signals into audible sound waves using a speaker close to ears. When in use, most of the existing headsets are used in front of computers, so a person will experience neck discomfort after sitting for a long period of time. To soothe the neck of the person:

When the embodiment is used, firstly, the elastic neck band 1 is worn on the neck of the person, the second sliding sleeve 7 can be slid on the first sliding sleeve 5 through the shear fork expansion and contraction mechanism 6 due to different lengths of necks of different persons, and the height of the massaging pad 8 is adjusted to be aligned with the neck of the person; then the first electric telescopic rod 20 is started to drive the first connecting rod 13 to get close to the neck of the person so that the massaging pad 8 is fitted with the neck of the person; the motor 19 is started to drive the eccentric block 18 to continuously rotate; due to the irregular shape of the eccentric block 18, when the convex end of the eccentric block 18 is in contact with the vibrating plate 31, the massaging pad 8 will squeeze the neck of the person, and when the arc end of the eccentric block 18 is in contact with the vibrating plate 31, the vibrating plate 31 will recover under the action of the spring damper 17 so that the massaging pad 8 can produce vibration to massage the neck of the person, which is vibratory massage; when it is necessary to knead the neck of the person, the second electric telescopic rod 22 can be started to drive the fourth connecting rod 23 to move away from the neck of the person so that the third connecting rods 15 on both sides can rotate in different directions at the same time, the connecting rods 33 on both sides can drive the rectangular plate 24 to move and squeeze the massaging pad 8, and both ends of the massaging pad 8 are squeezed to the middle part, so the massaging pad 8 presents a kneading action to knead the neck of the person, so as to realize another massage method, thus having an adjustable massage effect on the neck of the person, and two massage methods of vibration and kneading can be used to realize the diversification of massage actions so that the person feels more comfortable and more soothing.

In the embodiment, as shown in FIG. 1, both sides of the upper end of the elastic neck band 1 are fixedly connected with a support rod 2 respectively, the upper end of the support rod 2 is fixedly connected with an earphone cover 3, and the sides of the earphone covers 3 close to each other are provided with a damping ring 4 respectively.

Specifically, the earphone covers 3 are fitted with the ears of a person, and the sound is transmitted to the person through the earphone covers 3 and the damping rings 4, thus having a cushioning effect on the ears of the person so that the sound is more soothing, which prevents the ears of the person from being injured.

In the embodiment, as shown in FIG. 1 to FIG. 8, one side of the elastic neck band 1 is also provided with a harness storage mechanism with adjustable length.

The harness storage mechanism with adjustable length comprises a wind-up roll 11 rotatably arranged on the front end of the right side of the elastic neck band 1, and both sides of the wind-up roll 11 are sleeved and fixedly connected with a limit disc 32 respectively.

The central part of the right end surface of the limit disc 32 on the right side is fixedly connected with a turning block 25, and the surface of the turning block 25 is provided with anti-skid texture.

An earphone cord 12 is wound on the wind-up roll 11, and the bottom of the earphone cord 12 is provided with a connector 10.

The front end of the right side of the elastic neck band 1 is fixedly connected with a groove plate 26, the groove plate 26 is slidably connected with a lifting rod 27, the lifting rod 27 is slidably connected with a sliding column 30, the upper end of the sliding column 30 is fixedly connected to the groove plate 26, the lower end of the sliding column 30 is fixedly connected to the groove plate 26, the upper end of the sliding column 30 is sleeved with a spring 29, the upper end of the spring 29 is fixedly connected with the groove plate 26, the lower end of the spring 29 is fixedly connected with the sliding column 30, and the right end of the lifting rod 27 is rotatably provided with a pressure roller 28.

Specifically, since the earphone cord 12 is wound on the wind-up roll 11, the wind-up roll 11 is rotated by manually rotating the turning block 25 so as to wind or unwind the earphone cord 12; when the earphone cord 12 is wound or unwound, the length of the connector 10 can be adjusted so that the connector 10 can be inserted into the interface of the host to adapt to different use demands, which is convenient; and under the action of the spring 29, the lifting rod 27 uses the pressure roller 28 to compress the earphone cord 12 at the wind-up roll 11 under the elastic force of the spring 29, so as to prevent the earphone cord 12 from getting loose and messy. Moreover, since the pressure roller 28 is rotatably arranged on the lifting rod 27, the pressure roller 28 will not cause the earphone cord 12 to be moved difficultly under the influence of friction during the winding or unwinding process of the earphone cord 12.

Working principles: a headphone is a converting unit, which accepts electric signals from a media player or receiver and converts the signals into audible sound waves using a speaker close to ears. When in use, most of the existing headsets are used in front of computers, so a person will experience neck discomfort after sitting for a long period of time. To soothe the neck of the person, the elastic neck band 1 is worn on the neck of the person, the earphone covers 3 are fitted with the ears of the person, and the sound is transmitted to the person through the earphone covers 3 and the damping rings 4, thus having a cushioning effect on the ears of the person so that the sound is more soothing, which prevents the ears of the person from being injured. The second sliding sleeve 7 can be slid on the first sliding sleeve 5 through the shear fork expansion and contraction mechanism 6 due to different lengths of necks of different persons, and the height of the massaging pad 8 is adjusted to be aligned with the neck of the person; then the first electric telescopic rod 20 is started to drive the first connecting rod 13 to get close to the neck of the person so that the massaging pad 8 is fitted with the neck of the person; the motor 19 is started to drive the eccentric block 18 to continuously rotate; due to the irregular shape of the eccentric block 18, when the convex end of the eccentric block 18 is in contact with the vibrating plate 31, the massaging pad 8 will squeeze the neck of the person, and when the arc end of the eccentric block 18 is in contact with the vibrating plate 31, the vibrating plate 31 will recover under the action of the spring damper 17 so that the massaging pad 8 can produce vibration to massage the neck of the person, which is vibratory massage; when it is necessary to knead the neck of the person, the second electric telescopic rod 22 can be started to drive the fourth connecting rod 23 to move away from the neck of the person so that the third connecting rods 15 on both sides can rotate in different directions at the same time, the connecting rods 33 on both sides can drive the rectangular plate 24 to move and squeeze the massaging pad 8, and both ends of the massaging pad 8 are squeezed to the middle part, so the massaging pad 8 presents a kneading action to knead the neck of the person, so as to realize another massage method, thus having an adjustable massage effect on the neck of the person, and two massage methods of vibration and kneading can be used to realize the diversification of massage actions so that the person feels more comfortable and more soothing. Since the earphone cord 12 is wound on the wind-up roll 11, the wind-up roll 11 is rotated by manually rotating the turning block 25 so as to wind or unwind the earphone cord 12; when the earphone cord 12 is wound or unwound, the length of the connector 10 can be adjusted so that the connector 10 can be inserted into the interface of the host to adapt to different use demands, which is convenient; and under the action of the spring 29, the lifting rod 27 uses the pressure roller 28 to compress the earphone cord 12 at the wind-up roll 11 under the elastic force of the spring 29, so as to prevent the earphone cord 12 from getting loose and messy. Moreover, since the pressure roller 28 is rotatably arranged on the lifting rod 27, the pressure roller 28 will not cause the earphone cord 12 to be moved difficultly under the influence of friction during the winding or unwinding process of the earphone cord 12.

The above shows and describes the basic principle, main features and advantages of the present invention. Those skilled in the art shall understand that the present invention is not limited by the above embodiment. The above embodiment and the description merely illustrate the principle of the present invention. Various changes and improvements can also be made to the present invention without departing from the spirit and scope of the present invention, and shall fall into the protection scope of the present invention. The protection scope of the present invention is defined by the appended claims and equivalents.

What is claimed is:

1. A massage soothing earphone, comprising an elastic neck band (1), wherein both sides of the upper end of the elastic neck band (1) are fixedly connected with a support rod (2) respectively, the upper end of the support rod (2) is fixedly connected with an earphone cover (3), and the inner side of the elastic neck band (1) is provided with an adjustable pressing-kneading integrated mechanism for massaging the neck of a person;

the adjustable pressing-kneading integrated mechanism comprises a first sliding sleeve (5) fixedly connected to the middle part of the rear side of the elastic neck band (1), the first sliding sleeve (5) is slidably connected with a second sliding sleeve (7), the lower end surface of the second sliding sleeve (7) is fixedly connected with a case (9), both ends of the rear side of the lower end surface of the inner cavity wall of the case (9) are fixedly connected with a fixing rod (21) respectively, the upper end of the fixing rod (21) is fixedly connected with a support plate (16), both sides of the front end surface of the support plate (16) are fixedly connected with a spring damper (17) respectively, the piston end of the spring damper (17) is fixedly connected with a vibrating plate (31), both sides of the front end surface of the vibrating plate (31) are fixedly connected with a first electric telescopic rod (20) respectively, the piston end of the first electric telescopic rod (20) is fixedly connected with a first connecting rod (13), the left and right ends of the first connecting rod (13) are rotatably provided with a second connecting rod (14) respectively, the front end of the second connecting rod (14) is rotatably provided with a third connecting rod (15), one side away from the front end surface of the third connecting rod (15) is fixedly connected with a connecting rod (33), the front end of the connecting rod (33) is fixedly connected with a rectangular plate (24), and the front side of the rectangular plate (24) is fixedly connected with a massaging pad (8).

2. The massage soothing earphone according to claim 1, wherein the middle part of the lower side of the support plate (16) is fixedly connected with a motor (19), the output end of the motor (19) is fixedly connected with an eccentric block (18), and the eccentric block (18) is rotatably arranged on the support plate (16).

3. The massage soothing earphone according to claim 1, wherein the middle part of the rear end surface of the first connecting rod (13) is fixedly connected with a second electric telescopic rod (22), the piston end of the second electric telescopic rod (22) is fixedly connected with a fourth connecting rod (23), and the left and right ends of the fourth connecting rod (23) are rotatably connected with the third connecting rod (15) respectively.

4. The massage soothing earphone according to claim 1, wherein the upper end of the inner cavity of the first sliding sleeve (5) is provided with a shear fork expansion and contraction mechanism (6), the lower end of the shear fork expansion and contraction mechanism (6) is provided with a mounting plate (34), and the mounting plate (34) is fixedly connected with the case (9).

5. The massage soothing earphone according to claim 1, wherein both sides of the upper end of the elastic neck band (1) are fixedly connected with a support rod (2) respectively, the upper end of the support rod (2) is fixedly connected with an earphone cover (3), and the sides of the earphone covers (3) close to each other are provided with a damping ring (4) respectively.

6. The massage soothing earphone according to claim 5, wherein one side of the elastic neck band (1) is also provided with a harness storage mechanism with adjustable length.

7. The massage soothing earphone according to claim 6, wherein the harness storage mechanism with adjustable length comprises a wind-up roll (11) rotatably arranged on the front end of the right side of the elastic neck band (1), and both sides of the wind-up roll (11) are sleeved and fixedly connected with a limit disc (32) respectively.

8. The massage soothing earphone according to claim 7, wherein the central part of the right end surface of the limit disc (32) on the right side is fixedly connected with a turning block (25), and the surface of the turning block (25) is provided with anti-skid texture.

9. The massage soothing earphone according to claim 7, wherein an earphone cord (12) is wound on the wind-up roll (11), and the bottom of the earphone cord (12) is provided with a connector (10).

10. The massage soothing earphone according to claim 9, wherein the front end of the right side of the elastic neck band (1) is fixedly connected with a groove plate (26), the groove plate (26) is slidably connected with a lifting rod (27), the lifting rod (27) is slidably connected with a sliding column (30), the upper end of the sliding column (30) is fixedly connected to the groove plate (26), the lower end of the sliding column (30) is fixedly connected to the groove plate (26), the upper end of the sliding column (30) is sleeved with a spring (29), the upper end of the spring (29) is fixedly connected with the groove plate (26), the lower end of the spring (29) is fixedly connected with the sliding column (30), and the right end of the lifting rod (27) is rotatably provided with a pressure roller (28).

* * * * *